April 19, 1955     W. F. ALLER     2,706,339
GAUGING DEVICE
Filed March 3, 1953
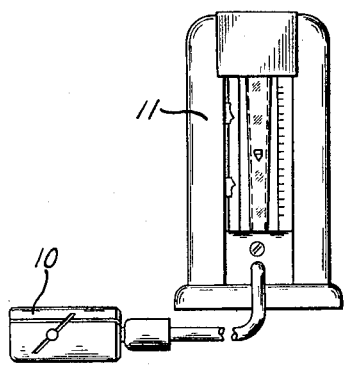
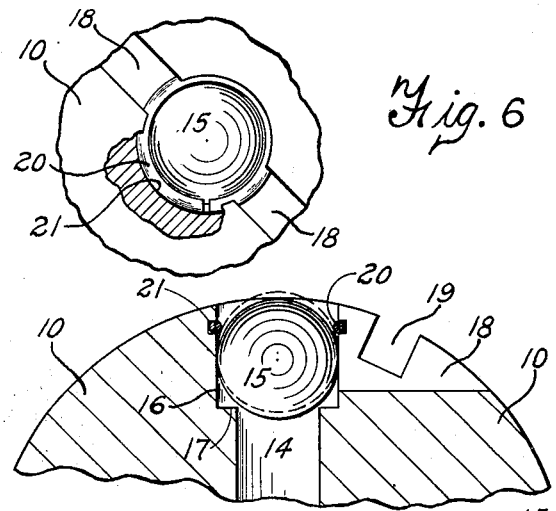
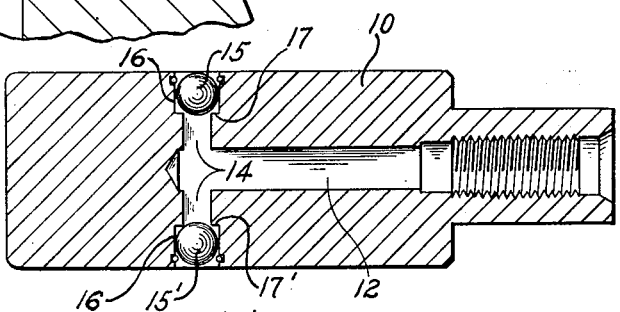
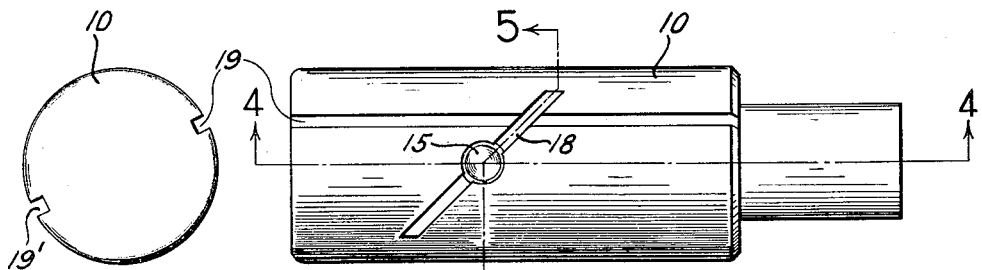
INVENTOR.
W. F. Aller
BY Edward J. ...
atty.

United States Patent Office 2,706,339
Patented Apr. 19, 1955

2,706,339

GAUGING DEVICE

Willis Fay Aller, Dayton, Ohio, assignor to The Sheffield Corporation, Dayton, Ohio, a corporation of Ohio Application March 3, 1953, Serial No. 340,011

8 Claims. (Cl. 33—178)

This invention relates to gauge heads for use with air gauges or the like which are responsive to changes in the flow of air or other fluid under pressure.

One object of the invention is the provision of a gauge head of the character mentioned for gauging inside diameters, and which is of extremely simple construction but achieves accurate results over a long service life.

Another object is the provision of a gauge head of simple construction, embodying a plurality of work contacting balls the inner portions of which conjointly control the flow of air through the gauge head, the balls being carried for limited axial movement in pockets formed directly in the gauge head.

Another object is the provision of a gauge head having work contacting balls arranged in pockets formed in the gauge head which balls are restrained from movement out of the pockets by removable retaining means situated in the pockets outward of the balls.

Another object is the provision of a gauge head of the character referred to wherein the body portion is integrally provided with orifice forming shoulders cooperating with the balls.

Another object is the provision of a gauge head of the character referred to wherein each ball is held within its pocket by a snap ring seated in the outer pocket surface and having such limited clearance between its ends that the snap ring can only be removed by overlapping its ends.

Other objects and advantages of the invention will be apparent from the following description, the appended claims and the accompanying drawing, in which, Figure 1 is a view of a gauge head embodying the present invention used in conjunction with a column type flow measuring instrument, Figure 2 is a side view of a gauge head embodying the present invention, Figure 3 is an end view of the gauge head, Figure 4 is a sectional view along the line 4—4 of Figure 2, Figure 5 is a fragmentary sectional view taken along the line 5—5 of Figure 2, and Figure 6 is a view of the gauge head adjacent the ball and its pocket, showing the snap ring and ball in detail and partially broken away.

Referring more particularly to the drawing in which the same reference numerals are applied to like parts in the different views, the work engaging member is indicated at 10 in Figure 1. It is supplied with air under pressure through a flow measuring instrument 11. As shown, the work engaging member 10 is formed as a spindle and is used for measuring the internal diameters of round holes. It will be apparent that this invention is not limited to the gauging of internal diameters nor is it restricted to use with any particular type of air flow measuring device.

The spindle 10 has a longitudinal passage 12 which extends along the inner portion of its length and through which air under controlled pressure is supplied. At its outer end this passage 12 communicates, in the illustrative embodiment, with a diametral passage 14. The flow outward through the radial sections of passage 14 is controlled by work positioned balls 15 and 15'. This invention and the advantages thereof will be explained with reference to one of the balls and its associated structure.

The ball 15 is situated in a pocket 16 which is formed as a counterbore directly in the spindle 10. At the radially inner end of the pocket 16, where it joins the diametral passage 14, is an orifice forming shoulder 17. The pocket 16 communicates through a skewed channel 18 with a longitudinal air escape groove 19 in the surface of the spindle 10.

The channel 18 is skewed out of a plane perpendicular to the spindle axis. When a channel directly transverse the spindle axis is employed there is a possibility of the hole edge entering the channel and preventing the easy entry of the spindle if it were inserted cocked relative to the axis of the hole being gauged. With the skewed channel 18 as herein disclosed easy entry is assured.

During the gauging operation the ball 15 is urged radially outward into engagement with the work by the flow of air through the passage 14. The position of the ball in the pocket 16 is controlled by the workpiece. The inner surface of the ball 15 cooperates with the orifice forming shoulder 17 and controls the amount of flow therethrough to channel 18 and the groove 19. This workpiece control flow is indicated on the instrument 11.

As is shown in more detail in Figures 5 and 6, the ball is situated in contiguous relationship with the walls of the pocket 16 which are surfaces of the spindle 10 itself. The ball is freely rotatable in the pocket and is moveable along the axis of the pocket. The pocket 16 has a diameter larger than the diameter of the ball only to the extent of an operating clearance and the ball is guided for movement toward and from the annular shoulder 17 by the pocket wall. The outward movement of the ball by the flow of air past the orifice forming shoulder 17 is limited by a snap ring 20 seated in a groove 21 formed in the pocket 16 outwardly of the ball center. The ball 15 is shown in Figure 5 in solid lines with its outer circumference tangential to the surface of the spindle 10. It should be noted that when the ball is in this position there is a small clearance between it and the shoulder 17. This relationship between the ball diameter and the depth of the pocket 16 protects the orifice forming shoulder 17 from being engaged or damaged by the ball should the ball be contacted forcibly. The snap ring 20 and its groove 21 are so located as to allow the ball to protrude from the surface of the spindle for contact with the workpiece being gauged. This association for the ball 15 is shown in dotted lines in Figure 5.

In order to prevent the casual removal of the balls 15, 15' from the spindle 10 and their possible loss or damage, the snap ring 20 is formed with limited clearance between its ends. This makes it necessary to overlap the ends of the snap ring 20 in order to remove it from the groove 21. When the snap ring and ball element are first assembled in the spindle 10, their association is as shown in Figure 6, that is, with the ends of the snap ring situated around in the groove from the channel 18. In order to conveniently remove the snap ring it is rotated in the groove until the ends of the ring 20 appear in the channel 18 and then the ends are accessible and can be overlapped and the ring removed. The simplicity and inherent reliability of the invention will now be apparent.

In making a diameter measurement, the spindle 10 is inserted into the hole to be gauged. The air passing through passages 12 and 14 acts against the inner surfaces of the balls 15 and 15' and urges them radially outward against the workpiece surface. The balls 15 and 15' are positioned by the workpiece surface toward the orifice forming shoulders 17 and 17'. The annular paths formed between the balls and the adjacent shoulders conjointly control the amount of flow taking place through the gauge head. Because of this conjoint action of both balls in controlling the flow through the gauge head, although somewhat more flow may take place past one of the balls than the other when the gauge head is off center, the total flow will remain the same as if the gauge head were exactly centered. Because the balls 15 and 15' are freely rotatable in their respective pockets no substantial wear will result from the insertion into or movement of the spindle 10 from workpiece holes. Neither the orifice forming shoulders nor the inner surfaces of the balls themselves can be damaged by accidentally striking the balls because there is clearance between the surfaces and balls in all gauging positions. As will be quite apparent the spindle and ball structure is extremely simple and rugged and involves a minimum of parts. Thus the device is comparatively cheap in cost. Because of its inherent features it will have a long service life while retaining a high degree of precision.

Although the outward air pressure on the balls urges them into contact with the hole being gauged, this does not involve a high gauging pressure and no damage of the workpiece results nor are the ball surfaces abraded or otherwise worn by the workpiece.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging head of the character described adapted for use with an air gauge or the like comprising a body having a fluid supply passage, said body having a counterbore at the outlet of the passage providing a pocket the walls of which are surfaces of the body itself, which pocket has an annular shoulder at the inner end thereof, a ball rotatable in the pocket in contiguous relationship with the walls thereof, the diameter of the pocket being larger than the diameter of the ball only to the extent of an operating clearance between the pocket wall and the ball surface to guide the ball for movement toward and from the annular shoulder, the annular shoulder directly cooperating with the inner side of the ball to control flow from the passage towards the ball, an air escape channel in the surface of said body communicating with the pocket, and a removable retaining means in the pocket engageable by outward portions of said ball for removably retaining the ball in the pocket and limiting the travel of the ball away from the annular shoulder to such extent that the outer portion of the ball extends beyond the body in a gauging operation for contact with the work to be gauged, the ball diameter and pocket depth being so related that there is clearance between the annular shoulder and inner ball surface when the outer ball surface is tangent to the surface of the gauging head body.

2. A gauging head of the character described adapted for use with an air gauge or the like comprising a body having a fluid supply passage, said body having a pocket at the passage outlet, an annular shoulder at the inner end of the pocket, a ball arranged for rotation in the pocket and for limited movement axially of the pocket, the annular shoulder directly cooperating with the inner side of the ball to control flow from the passage towards the ball, an air escape channel in the surface of the body communicating with the pocket, the pocket wall having an annular groove outward of said ball, a snap ring seated in said groove and engageable by outward portions of said ball for removably retaining the ball in the pocket and limiting the travel of the ball away from the annular shoulder to such extent that the outer portion of the ball extends beyond the adjacent portions of the body in a gauging operation for contact with the work to be gauged.

3. A gauging head of the character described adapted for use with an air gauge or the like comprising a body having a fluid supply passage, said body having a pocket at the passage outlet, an annular shoulder at the inner end of the pocket, a ball arranged for rotation in the pocket and for limited movement axially of the pocket, the annular shoulder directly cooperating with the inner side of the ball to control flow from the passage towards the ball, an air escape channel in the surface of the body communicating with the pocket, the pocket wall having an annular groove outward of said ball, a snap ring seated in said groove and engageable by outward portions of said ball for removably retaining the ball in the pocket and limiting the travel of the ball away from the annular shoulder to such extent that the outer portion of the ball extends beyond the adjacent portions of the body in a gauging operation for contact with the work to be gauged, said snap ring having a limited clearance between its ends whereby its ends must be overlapped in order to insert it into or remove it from the groove.

4. A gauging head of the character described essentially consisting of only a unitary spindle body, two balls and two snap rings, said spindle having a longitudinal passage through a portion of its length adapted for connection to an air supply and an air gauge, said spindle having a diametral bore therethrough communicating with said passage, said spindle having counterbores therein at the bore outlets, the counterbores constituting ball receiving pockets having orifice forming annular shoulders at their inner ends, air escape channels in the surface of said spindle communicating laterally with each of said pockets, the wall of each pocket having an annular groove between the midpoint and outer end thereof, said balls being arranged in said pockets for free rotation and workpiece controlled bodily movement axially of the pocket for control of said orifice in accordance with workpiece dimensions, one of said snap rings being seated in each of said annular grooves to retain said balls in said pockets.

5. A gauging head of the character described adapted for use with an air gauge or the like comprising a body having a fluid supply path and a transverse bore directly in the body and in communication therewith, said body having a counterbore therein concentric with the bore providing a pocket the walls of which are surfaces of the body itself, the bore and the counterbore forming an annular shoulder at the inner end of the pocket, a ball rotatable in the pocket in contiguous relationship to the walls thereof, the annular shoulder directly cooperating with the inner side of the ball to control flow from the bore toward the ball, an air escape channel in the surface of said body communicating with the pocket, the pocket wall having an annular groove therein outward of said ball, a snap ring seated in said groove and engageable by outward portions of said ball for removably retaining the ball in the pocket and limiting the travel of the ball away from the annular shoulder to such extent that the outer portion of the ball extends beyond the adjacent portions of the body in a gauging operation for contact with the work to be gauged.

6. A gauging head of the character described adapted for use with an air gauge or the like comprising a spindle having a fluid supply path therein and a diametral bore in communication with said fluid supply path, said spindle having counterbores at the bore outlets providing ball receiving pockets the walls of which are surfaces of the spindle itself, which pockets have annular shoulders at the inner ends thereof, a ball rotatable in each of the pockets in contiguous relationship to the walls thereof, the diameter of each pocket being larger than the diameter of the respective ball only to the extent of an operating clearance between the pocket wall and the ball surface to guide the ball for movement toward and from the respective annular shoulder, each annular shoulder directly cooperating with the inner side of the respective ball to control flow from the bore toward the ball, air escape channels in the surface of said spindle communicating with the pockets, and a removable retaining means in each of the pockets engageable by outward portions of the respective ball for removably retaining the ball in the pocket and limiting the travel of the ball away from the annular shoulder to such extent that the outer portion of each ball extends beyond the adjacent portions of the spindle in a gauging operation for contact with the work to be gauged.

7. A gauging head of the character described adapted for use with an air gauge or the like comprising a spindle having a fluid supply path and radially opposed passages in communication with said fluid supply path, said spindle having counterbores therein at the outlets of each of the radially opposed passages providing pockets the walls of which are surfaces of the spindle itself, which pockets have annular shoulders at the inner ends thereof, a ball rotatable in each of the pockets in contiguous relationship to the walls thereof, each annular shoulder directly cooperating with the inner side of the respective ball to control flow from the radially opposed passage toward the ball, said spindle having longitudinal grooves in the surface thereof, air escape channels between each of the pockets and the longitudinal groove, the channels being disposed in skewed relationship to the axis of the spindle and having a width which is smaller than the diameter of the pockets themselves, the wall of each pocket having an annular groove therein outward of the respective ball and a snap ring seated in said groove and engageable by outward portions of the ball for removably retaining the ball in the pocket and limiting the travel of the ball away from the annular shoulder to such extent that the outer portion of each of the balls extends beyond the adjacent portions of the spindle in a gauging operation for contact with the work to be gauged.

8. A gauging head adapted for use with an air gauge or the like comprising a body having a fluid supply passage, said body having a pocket formed therein at the passage outlet, the pocket having a cylindrical outer wall which is a surface of the body itself and the pocket diameter exceeding the diameter of the supply passage to provide an annular ball seat, a ball rotatable in the pocket in contiguous relationship with the wall thereof, the diameter of the pocket being larger than the diameter of the ball only to the extent of an operating clearance between the pocket wall and the ball surface to guide the ball for movement toward and from the seat, the ball directly cooperating with the seat to control flow from the passage toward the ball, the pocket having an annular groove in the wall thereof outward of the center of said ball, a snap ring seated in said groove and projecting annularly out of the groove into the pocket for engagement by outward portions of said ball for removably retaining the ball in the pocket and limiting the travel of the ball away from the seat to such an extent that the outer portion of the ball extends beyond the adjacent portion of the body in a gauging operation for contact with the work to be gauged, said body having air escape passage means communicating with the pocket at a point between the groove and the annular seat providing escape to atmosphere for air passing between the ball and the seat.

References Cited in the file of this patent

UNITED STATES PATENTS

| | | |
|---|---|---|
| 2,306,469 | Rupley | Dec. 29, 1942 |
| 2,501,130 | Kuppersmith | Mar. 21, 1950 |
| 2,501,965 | Rupley | Mar. 28, 1950 |